(12) United States Patent
McFarthing et al.

(10) Patent No.: US 8,622,313 B1
(45) Date of Patent: Jan. 7, 2014

(54) NEAR FIELD COMMUNICATIONS DEVICE

(71) Applicant: Cambridge Silicon Radio Limited, Cambridge (GB)

(72) Inventors: Anthony McFarthing, Cambridgeshire (GB); Shyam Patel, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/626,014

(22) Filed: Sep. 25, 2012

(51) Int. Cl.
    *G06K 19/06* (2006.01)
(52) U.S. Cl.
    USPC ........................................ 235/492; 455/232.1
(58) Field of Classification Search
    USPC ........................................ 235/492; 455/232.1
    See application file for complete search history.

(56) References Cited

U.S. PATENT DOCUMENTS

| | | | |
|---|---|---|---|
| 7,619,468 B1* | 11/2009 | Bowles et al. | 330/124 R |
| 2002/0033328 A1* | 3/2002 | Stimson | 204/192.12 |
| 2005/0201707 A1* | 9/2005 | Glebov et al. | 385/132 |
| 2006/0099922 A1* | 5/2006 | Yamamoto et al. | 455/232.1 |
| 2011/0301450 A1* | 12/2011 | Hue et al. | 600/411 |
| 2012/0247679 A1* | 10/2012 | Yamazawa | 156/345.48 |

* cited by examiner

*Primary Examiner* — Allyson Trail
(74) *Attorney, Agent, or Firm* — RatnerPrestia

(57) ABSTRACT

The present application relates to a near field communications (NFC) device having an antenna which is coupled to a load. When in the presence of an active NFC reader or similar device, the antenna generates an electromotive force (EMF), which serves as an input signal to the load. A variable potential divider is included to vary the voltage of the input signal to the load, so that if a potentially damaging over-voltage condition exists the voltage of the input signal to the load can be reduced to a safe level. The variable potential divider may be composed of an effective source impedance and an effective impedance of the load, and the impedance of the impedance matching network may be variable by means of a variable capacitance and/or a variable resistance.

9 Claims, 6 Drawing Sheets

NEAR FIELD COMMUNICATIONS DEVICE

TECHNICAL FIELD

The present application relates to a near field communications (NFC) device such as an NFC tag or an NFC reader operating in a tag emulation mode.

BACKGROUND TO THE INVENTION

A near field communications (NFC) tag typically includes an antenna which is connected, via an impedance matching network, to a tag receiver made up of semiconductor components which implement functionality of the tag. The tag receiver has an input impedance which is typically different from an output impedance of the antenna, and so the impedance matching network is used to match the antenna impedance to the input impedance of the tag receiver.

The semiconductor components of the tag receiver are typically configured to operate within a specific range of voltages. For example, the tag receiver may be made up of CMOS semiconductor components. To protect these CMOS semiconductor components from damage resulting from input signals whose voltage amplitude is too high, the tag may include a voltage limiter, which may also act to prevent the semiconductor components from being reverse biased.

The correct operation of the voltage limiter depends upon the source impedance of the impedance matching network. If the source impedance is too low the voltage limiter will not function correctly.

SUMMARY OF INVENTION

The present application relates to a near field communications (NFC) device such as an NFC tag or an NFC reader operating in a tag emulation mode having an antenna which is coupled to a load. When in the presence of an active NFC reader or similar device, the antenna generates an electromotive force (EMF), which serves as an input signal to the load. A variable potential divider is included to vary the voltage of the input signal to the load, so that if a potentially damaging over-voltage condition exists the voltage of the input signal to the load can be reduced to a safe level. The variable potential divider may be composed of an effective source impedance, made up of the impedance of the antenna and an impedance matching network, and an effective impedance of the load, and the impedance of the impedance matching network may be variable by means of a variable capacitance and/or a variable resistance, such that the output voltage of the variable potential divider may be adjusted by adjusting the variable capacitance and/or variable resistance.

According to a first aspect of the invention there is provided a near field communications (NFC) device comprising an antenna for generating an electromotive force (EMF) and a load, the antenna and the load being coupled such that the EMF generated by the antenna provides an input signal for the load, wherein the NFC device further comprises a variable potential divider for varying the voltage of the input signal supplied to the load.

The variable potential divider permits adjustment of the voltage of the input signal to the load, and can be used to reduce the amplitude of input signal voltages that could damage semiconductor components of the load to a safe level.

The variable potential divider may be made up of an effective impedance of the load and an effective impedance of a source of the EMF.

The NFC device may further comprising an impedance matching network for matching an impedance of the antenna to an impedance of the load, such that the effective impedance of the source of the EMF is dependent upon an impedance of the impedance matching network, and the impedance of the impedance matching network may be variable.

The NFC device may further comprise an amplitude detector for detecting the amplitude of the EMF generated by the antenna and a voltage limiter for limiting the amplitude of the voltage supplied to the load.

The voltage limiter may comprise a positive voltage limiter for limiting positive voltages and a negative voltage limiter for limiting negative voltages.

The NFC device may further comprise a processor and a controller, the processor being configured to determine whether the detected amplitude is within safe limits for the voltage limiter and to cause the controller to adjust the impedance of the impedance matching network to reduce the amplitude of the EMF generated by the antenna if the detected amplitude is outside the safe limits.

The impedance matching network may comprise a variable capacitance and a variable resistance in parallel.

The controller may be configured to make coarse adjustments to the impedance of the impedance matching network by adjusting the value of the variable resistance, and to make fine adjustments to the impedance of the impedance matching network by adjusting the value of the variable capacitance.

The NFC device may be an NFC tag, for example.

BRIEF DESCRIPTION OF THE DRAWINGS

Embodiments of the invention will now be described, strictly by way of example only, with reference to the accompanying drawings, of which

DESCRIPTION OF THE EMBODIMENTS

Figure 1:
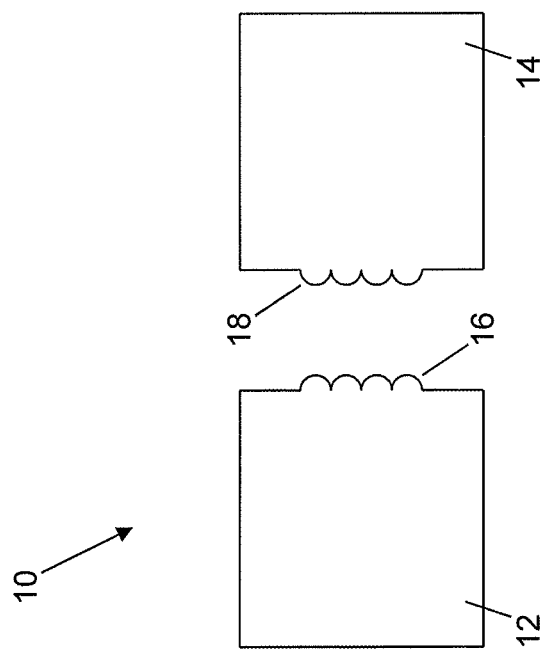
FIG. 1 is a schematic representation of a near field communication (NFC) system of an NFC reader and an NFC tag.

FIG. 1 is a schematic representation of a near field communications (NFC) system 10, in which an NFC reader 12 communicates with an NFC device 14 by generating an electromagnetic field around its antenna 16, which couples the reader antenna 16 to an antenna 18 of the NFC device 14. Typically the NFC device is a tag, but in some circumstances other NFC devices may emulate a tag, for example an NFC reader may operate in a tag emulation mode. In the following description the NFC device 14 will be referred to as a tag, but it is to be appreciated that the present invention may be implemented by any NFC device that exhibits tag-like behaviour, such as an NFC reader in tag emulation mode.

In a passive mode of communication the tag 14 modulates the electromagnetic field generated by the reader 12 to transmit data, whilst in an active mode of communication the reader 12 and tag 14 alternately generate their own electromagnetic fields to transmit data between the reader 12 and the tag 14.

Figure 2:
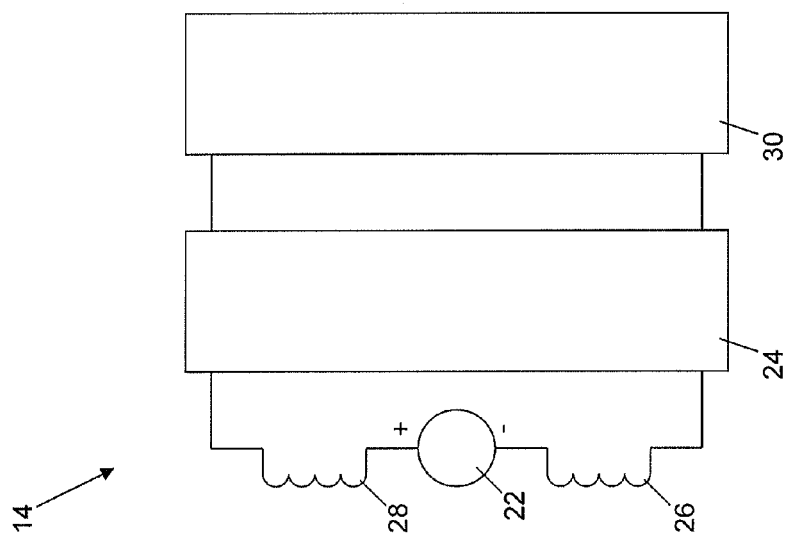
FIG. 2 is a schematic representation of an equivalent circuit representing the NFC tag shown in FIG. 1 in the presence of an NFC reader.

FIG. 2 is a schematic representation of an equivalent circuit representing the NFC tag 14 operating in a passive mode in the presence of the reader 12. As a result of magnetic coupling between the reader antenna 16 and the tag antenna 18, an electromotive force (EMF) is induced in the tag antenna 18, and thus the tag 14 can be modelled as a Faraday EMF generator 22 which couples to an antenna impedance matching network 24 via series inductances 26, 28. The antenna impedance matching network 24 in turn couples to a tag load, which in the model of FIG. 2 represents a tag receiver 30, which may be made up, for example, of semiconductor components.

Figure 3:
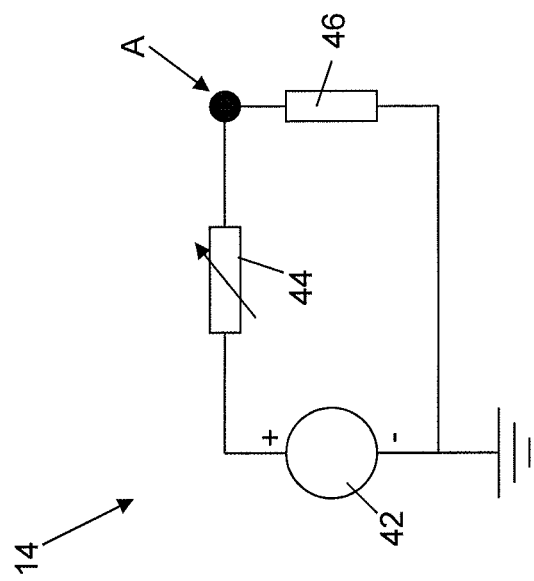
FIG. 3 is a schematic representation of an alternative representation of the equivalent circuit of FIG. 2.

The equivalent circuit of FIG. 2 can be re-drawn as shown in FIG. 3 as a single ended voltage source 42 with an equivalent series source impedance 44 that is dependent upon the tag antenna 18, the reader antenna 16, the impedance of the reader 12, an impedance of an antenna matching circuit in the tag 14 and a coupling factor between the tag antenna 18 and the reader antenna 16. The equivalent load impedance of the tag receiver 30 is represented by a further series impedance 46, which acts in parallel with the semiconductor components of the tag receiver 30.

It will be appreciated from this that the equivalent source impedance 44 and the equivalent load impedance 46 of the tag receiver form a potential divider. The effect of this is that the voltage, at node A in FIG. 3, of the input signal to the semiconductor components of the tag receiver 30 is dependent upon the magnitude of the equivalent source impedance and the equivalent load impedance.

As the equivalent source impedance 44 depends upon the tag antenna 18, the reader antenna 16, the impedance of the reader 12, an impedance of an antenna matching circuit in the tag 14 and the coupling factor between the tag antenna 18 and the reader antenna 16, the equivalent source impedance 44 varies as a function of the proximity of the tag antenna 18 to the reader antenna 16, since the coupling factor varies as a function of the proximity of the tag antenna 18 to the reader antenna 16. Thus, the voltage (at node A in FIG. 3) of the input signal to the semiconductor components of the tag receiver 30 is also subject to variation as a function of the proximity of the tag antenna 18 to the reader antenna 16.

The semiconductor components of the tag receiver 30 are typically CMOS components. In order to avoid any risk of damage to the CMOS components of the tag receiver 30, the input voltage (at node A) must not fall below around −0.5 volts or exceed around 4 volts. Accordingly, the tag receiver 30 includes an input voltage limiter which is operative to limit the voltage of a signal received at the tag receiver 30 from the tag antenna 18.

Figure 4:
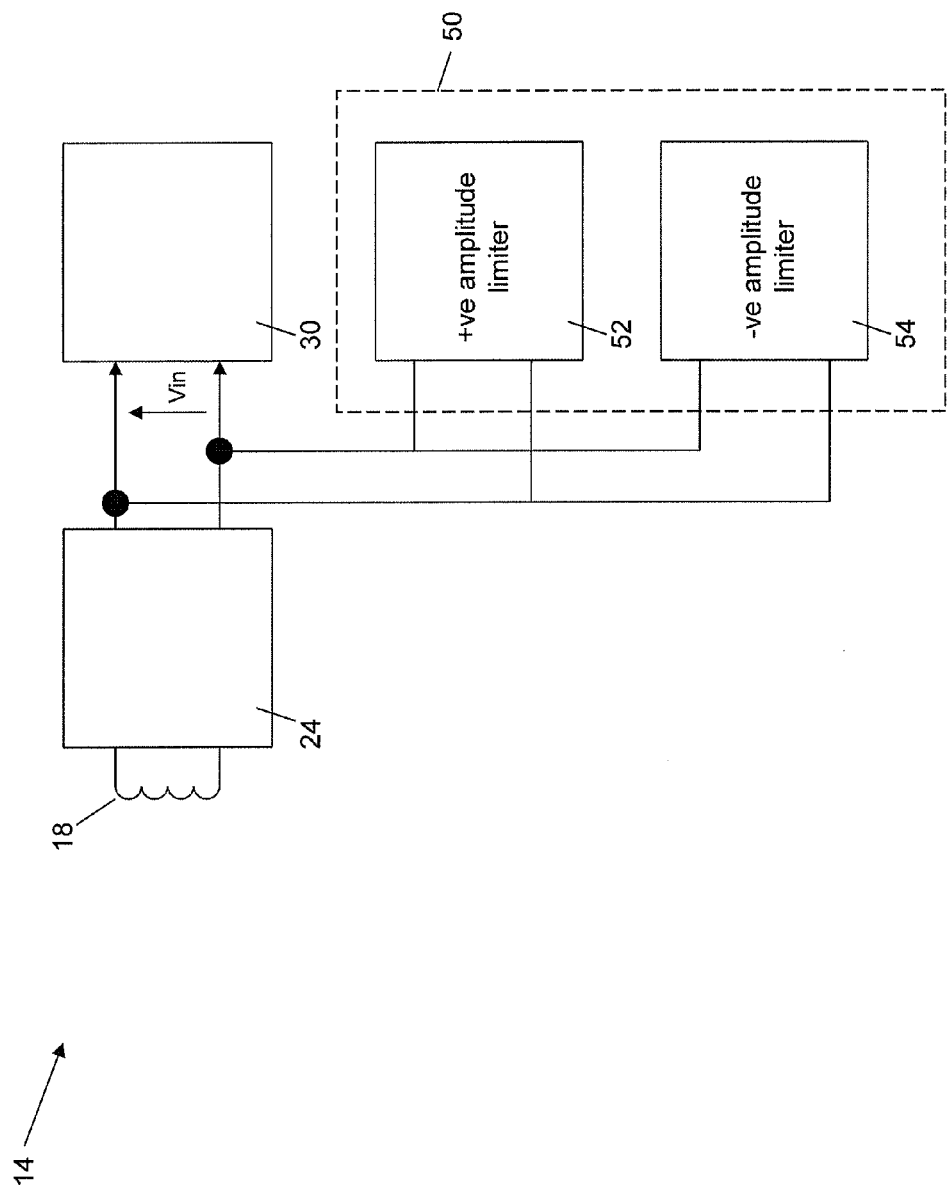
FIG. 4 is a schematic representation of an NFC tag that includes a voltage limiter.

The voltage limiter is shown generally at 50 in the schematic representation of FIG. 4. As can be seen from FIG. 4, the voltage limiter 50 includes a positive amplitude limiter 52 and a negative amplitude limiter 54.

A ground potential is defined as a reference for the EMF generated by the tag antenna 18, and the voltage output from the tag antenna 18 will swing above and below this ground potential. As is explained above, it is important that the positive swing does not exceed about 4 volts, whilst the negative swing should not exceed about −0.5 volts.

The EMF generated by the tag antenna 18 is input to both the positive amplitude limiter 52 and the negative amplitude limiter 54 in parallel. If the amplitude of the EMF generated by the tag antenna 18 is below about 4 volts, the positive amplitude limiter 52 does not operate, and the voltage limiter 50 permits a signal of unmodified amplitude to be input to the CMOS components of the tag receiver 30. However, if the amplitude of the EMF generated by the tag antenna 18 exceeds about 4 volts, the positive amplitude limiter 52 limits the amplitude of the input signal to the tag receiver 30 to about 4 volts.

Similarly, if the EMF generated by the tag antenna 18 is below about −0.5 volts, the negative amplitude limiter 54 operates and restricts the amplitude of the signal input to the CMOS components of the tag receiver 30 to about −0.5 volts, whilst if the EMF generated by the tag antenna 18 is above about −0.5 volts, the negative amplitude limiter 54 does not operate, and the voltage limiter 50 permits a signal of unmodified amplitude to be input to the CMOS components of the tag receiver 30 (subject of course to the operation of the positive amplitude limiter 52 if a positive over-voltage condition exists).

In order for the voltage limiter 50 to operate effectively the effective source impedance 44 must be maximised. However, as the effective source impedance 44 is variable, depending upon the proximity of the tag antenna 18 to the reader antenna 16, the effective source impedance cannot be maximised in all circumstances.

Figure 5:
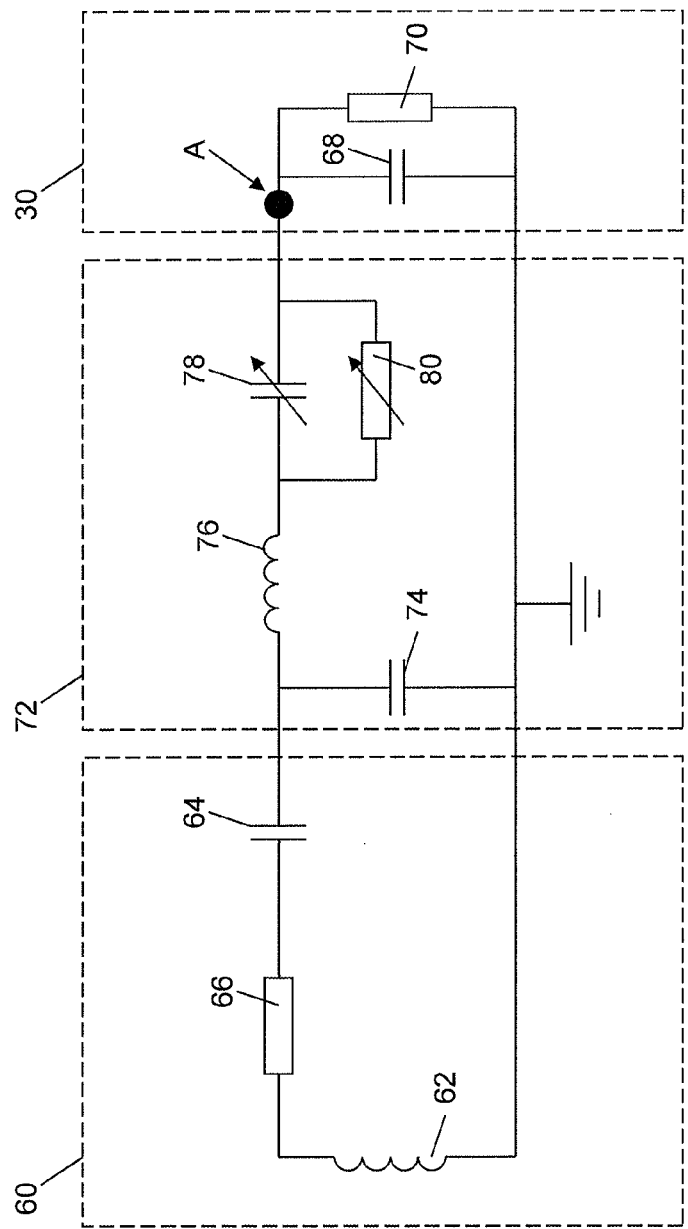
FIG. 5 is a schematic representation of an architecture for an NFC tag.

FIG. 5 is a schematic representation of a tag architecture in which this problem is addressed.

In the architecture illustrated in FIG. 5, a resonant network 60 (shown in dashed outline) is made up of a series combination of the inductance of the tag antenna 18, (represented in FIG. 5 by the inductance 62) and a capacitance 64, with a series resistance 66 representing the effective series resistance of the tag antenna 18. The value of the capacitance is selected such that the resonant network 60 has a resonant frequency equal to that of the carrier frequency used in an NFC system, e.g. 13.56 MHz.

The equivalent input (load) impedance of the tag receiver 30 is represented in FIG. 5 by a parallel combination of a capacitance 68 and a resistance 70.

The architecture of FIG. 5 also includes an impedance matching network 72 which is operative to move the high source impedance seen at the input of the tag antenna 18 to a lower impedance value. The impedance matching network is made up of a capacitance 74 in parallel with the resonant network 60 and an inductance 76 in series with the resonant network 60. A parallel combination of a variable capacitance 78 and a variable resistance 80 is connected in series with the inductance 76, and permits adjustment of the equivalent source impedance seen by the tag receiver 30 to ensure correct operation of the voltage limiter 50.

Figure 6:
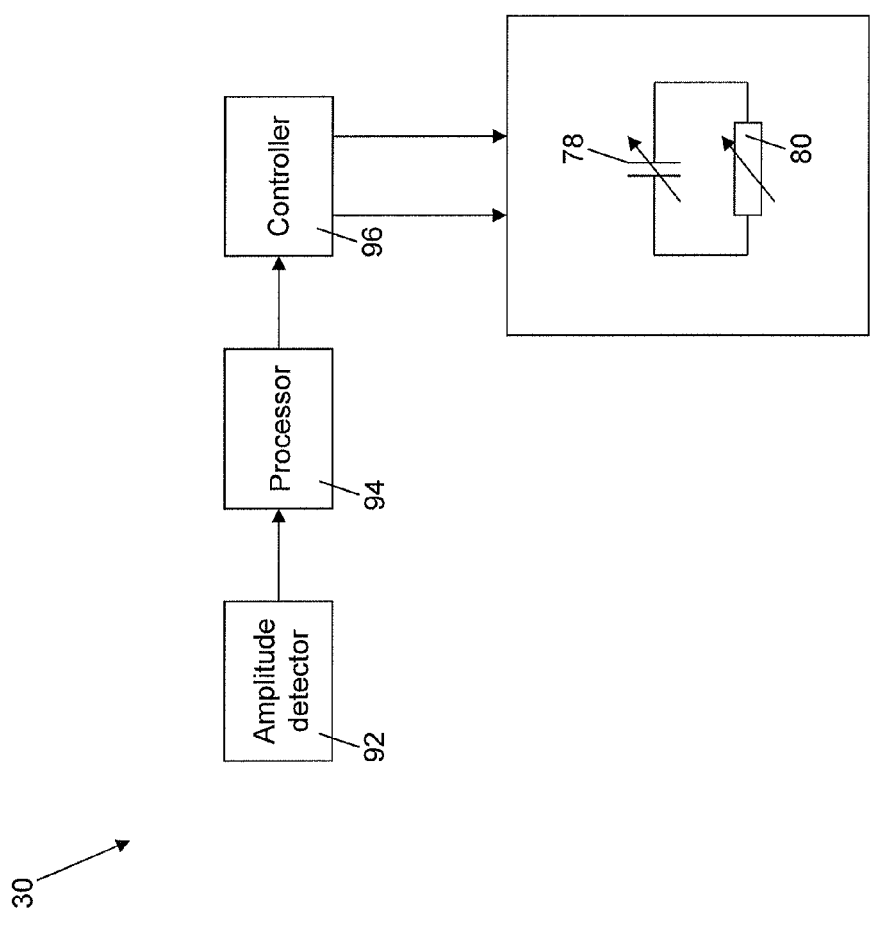
FIG. 6 is a schematic block diagram illustrating functions performed by a tag receiver of the NFC tag illustrated in FIG. 5.

FIG. 6 is a schematic block diagram illustrating functions performed by the tag receiver 30. It is to be appreciated that the functional blocks shown in FIG. 6 are representative only of functions performed by the tag receiver 30, and do not represent physical components of the tag receiver 30.

As can be seen from FIG. 6, the tag receiver 30 includes an amplitude detector 92, which may be implemented as part of an IQ receiver, for example, and which is operative to detect the amplitude of the voltage at the input to the tag receiver 30 (and therefore also at the input of the voltage limiter 50), as generated by the tag antenna 18.

An output of the amplitude detector 92 is connected to a processor 94, which is operative to determine whether the amplitude of the voltage input 50 to the tag receiver 30 is too great, either positive or negative, for the voltage limiter to limit the amplitude sufficiently to ensure that no damage to the semiconductor components of the tag receiver 30 occurs.

An output of the processor 94 is connected to an input of a controller 96, which in turn has outputs that connect to control inputs of the variable capacitor 78 and the variable resistor 80 respectively, such that the capacitance value of the variable capacitor 78 and the resistance value of the variable resistance 80 can be adjusted, to adjust the equivalent source impedance seen by the tag receiver 30, in response to changes in the equivalent impedance of the tag antenna 18 resulting from the proximity of an NFC reader 12, so as to adjust the input voltage to the tag receiver 30.

In operation of the architecture shown in FIG. 5, the amplitude detector 92 detects the amplitude of the voltage at the input of the tag receiver 30 resulting from the EMF generated by the tag antenna 18. If the processor 94 determines that the amplitude of the voltage is within safe positive and negative limits within which the voltage limiter 50 can operate effectively, no further action is taken.

However, if the processor 94 determines that the amplitude of the input voltage exceeds the safe positive or negative limit within which the voltage limiter can operate, it transmits a signal to the controller 96, to cause the controller 96 to adjust the value of the variable capacitor 78 and/or the variable resistor 80 so as to increase the effective source impedance seen by the tag receiver 30, thereby reducing the voltage at the input of the tag receiver 30.

The variable resistor 80 is used to implement a coarse change in the effective source impedance, whilst the variable capacitor 78 is used to implement a fine change in the effective source impedance. Thus, where the voltage amplitude detected by the amplitude detector is significantly greater (either positive or negative) than the safe amplitude limit of the voltage limiter 50, the controller 96 may cause a large change in the value of the variable resistance 80 to effect the required large change in the effective source impedance, thereby causing a large reduction in the amplitude of the voltage input to the tag receiver 30. In contrast, where the voltage amplitude detected by the amplitude detector 92 is only a small amount greater than the safe amplitude limit of the voltage limiter 50, the controller 96 may cause a change in the value of the variable capacitor 78 to effect the required small change in the effective source impedance, thereby causing only a small reduction in the amplitude of the voltage input to the tag receiver 30. Of course, the controller 96 may cause the value of both the capacitor 78 and the resistor 80 to change to effect the required change in the effective source impedance.

It will be appreciated that the variable capacitor 78 and the variable resistor 80 and the associated amplitude detector 92, processor 94 and controller 96 allow the physical size of the positive amplitude limiter 52 to be minimised, since the magnitude of the reduction in amplitude required can be controlled to a large extent by altering the effective source impedance seen by the tag receiver 30 by adjusting the values of the capacitor 80 and resistor 78.

In the foregoing description and the appended drawings, the invention has been described by reference to an NFC tag. However, it will be understood by those skilled in the art that the invention can be implemented as a standalone tag or in any device that exhibits tag-like behaviour, such as an NFC reader that is able to switch between tag and reader emulation modes.

The invention claimed is:

1. A near field communications (NFC) device comprising an antenna for generating an electromotive force (EMF) and a load, the antenna and the load being coupled such that the EMF generated by the antenna provides an input signal for the load, wherein the NFC device further comprises a variable potential divider for varying the voltage of the input signal supplied to the load.

2. An NFC device according to claim 1 wherein the variable potential divider is made up of an effective impedance of the load and an effective impedance of a source of the EMF.

3. An NFC device according to claim 2 further comprising an impedance matching network for matching an impedance of the antenna to an impedance of the load, such that the effective impedance of the source of the EMF is dependent upon an impedance of the impedance matching network, and wherein the impedance of the impedance matching network is variable.

4. An NFC device according to claim 3 further comprising an amplitude detector for detecting the amplitude of the EMF generated by the antenna and a voltage limiter for limiting the amplitude of the voltage supplied to the load.

5. An NFC device according to claim 4 wherein the voltage limiter comprises a positive voltage limiter for limiting positive voltages and a negative voltage limiter for limiting negative voltages.

6. An NFC device according to claim 4 further comprising a processor and a controller, the processor being configured to determine whether the detected amplitude is within safe limits for the voltage limiter and to cause the controller to adjust the impedance of the impedance matching network to reduce the amplitude of the EMF generated by the antenna if the detected amplitude is outside the safe limits.

7. An NFC device according to claim 6 wherein the impedance matching network comprises a variable capacitance and a variable resistance in parallel.

8. An NFC device according to claim 7 wherein the controller is configured to make coarse adjustments to the impedance of the impedance matching network by adjusting the value of the variable resistance, and to make fine adjustments to the impedance of the impedance matching network by adjusting the value of the variable capacitance.

9. An NFC device according to claim 1, wherein the NFC device is an NFC tag.

* * * * *

UNITED STATES PATENT AND TRADEMARK OFFICE
CERTIFICATE OF CORRECTION

Page 1 of 1

PATENT NO.        : 8,622,313 B1
APPLICATION NO.   : 13/626014
DATED             : January 7, 2014
INVENTOR(S)       : McFarthing et al.

It is certified that error appears in the above-identified patent and that said Letters Patent is hereby corrected as shown below:

In the Specification

In Column 5, Line 52, delete "capacitor 80 and resistor 78." and insert
-- capacitor 78 and resistor 80. --, therefor.

Signed and Sealed this
Twenty-second Day of April, 2014

Michelle K. Lee
*Deputy Director of the United States Patent and Trademark Office*